United States Patent
Sankey et al.

(10) Patent No.: US 10,201,815 B2
(45) Date of Patent: Feb. 12, 2019

(54) METHOD FOR THERMAL ABLATION OF PIGGING DEVICES

(71) Applicants: Mark S. Sankey, Washington, PA (US); James F. Stewart, Lafayette, AL (US); Andrew J. Pounds, Macon, GA (US); William Scott Stalnaker, Butler, GA (US); John R. Walker, Macon, GA (US); Dennis Aubrey Walker, Macon, GA (US); James R. Collins, Jackson's Gap, PA (US)

(72) Inventors: Mark S. Sankey, Washington, PA (US); James F. Stewart, Lafayette, AL (US); Andrew J. Pounds, Macon, GA (US); William Scott Stalnaker, Butler, GA (US); John R. Walker, Macon, GA (US); Dennis Aubrey Walker, Macon, GA (US); James R. Collins, Jackson's Gap, PA (US)

(*) Notice: Subject to any disclaimer, the term of this patent is extended or adjusted under 35 U.S.C. 154(b) by 0 days.

(21) Appl. No.: 15/788,673

(22) Filed: Oct. 19, 2017

(65) Prior Publication Data
US 2018/0056305 A1  Mar. 1, 2018

Related U.S. Application Data

(63) Continuation of application No. 15/187,866, filed on Jun. 21, 2016.

(51) Int. Cl.
*B02C 19/18* (2006.01)
*F16L 55/48* (2006.01)
(Continued)

(52) U.S. Cl.
CPC ............ *B02C 19/186* (2013.01); *F16L 55/40* (2013.01); *F16L 55/46* (2013.01); *F16L 55/48* (2013.01)

(58) Field of Classification Search
CPC ............................. F16L 55/42; E21B 43/263
(Continued)

(56) References Cited

U.S. PATENT DOCUMENTS

| 3,250,113 | A |   | 5/1966 | Rush |   |
| 4,756,250 | A | * | 7/1988 | Dias dos Santos | ....... C06C 5/00 |
|   |   |   |   |   | 102/202.3 |

(Continued)

FOREIGN PATENT DOCUMENTS

EP  0642847  3/1995

OTHER PUBLICATIONS

Pipeline Cleaning/Air-Water Jetting/Polly Pig Method.
(Continued)

*Primary Examiner* — Vivek Shirsat
(74) *Attorney, Agent, or Firm* — Tucker Arensberg, P.C.

(57) ABSTRACT

The present disclosure provides for a novel pig design and method of retrieval based on thermal ablation. The pig comprises an external layer and an inner core, where the inner core further comprises at least one incendiary charge comprising at least one exothermic material. When ignited via an ignition source, the incendiary charge releases the exothermic material into one or more thermal dispersion channels. The exothermic material melts the interior of these thermal dispersion channels thereby distributing the exothermic material throughout the pig device causing its destruction via thermal ablation. The destroyed pig can then be easily retrieved from its location in a pipe, as detected via radio signals, without the need for costly excavation of large sections of the pipe.

16 Claims, 20 Drawing Sheets

Pig Device

(51) Int. Cl.
*F16L 55/46* (2006.01)
*F16L 55/40* (2006.01)

(58) Field of Classification Search
USPC .................. 126/263.01–263.1; 166/299, 63; 102/364
See application file for complete search history.

(56) References Cited

U.S. PATENT DOCUMENTS

| | | | |
|---|---|---|---|
| 4,891,115 A | 1/1990 | Shishkin | |
| 5,215,781 A | 6/1993 | Lowther | |
| 5,298,281 A | 3/1994 | Lowther | |
| 5,300,151 A | 4/1994 | Lowther | |
| 5,300,152 A | 4/1994 | Lowther | |
| 5,565,633 A | 10/1996 | Wernicke | |
| 6,500,271 B1 | 12/2002 | Moore | |
| 6,817,298 B1 * | 11/2004 | Zharkov | E21B 43/006 102/288 |
| 7,279,052 B2 | 10/2007 | Kinnari | |
| 8,491,722 B2 | 7/2013 | Phipps | |
| 2002/0011124 A1 | 1/2002 | Phipps | |
| 2013/0062055 A1 * | 3/2013 | Tolman | E21B 23/00 166/250.01 |
| 2013/0276828 A1 | 10/2013 | Phipps | |

OTHER PUBLICATIONS

John W. Carpita, PE, What's In Your Water Mains? http://mrsc.org/Home/Stay-Informed/MRSC-Insight/July-2014/What%E2%80%99s-in-Your-Water-Mains.aspx.

Wastewater Technology Fact Sheet Sewers, Force Main, United States Environmental Protection Agency, Office of Water, Washington, D.C. Sep. 2000.

Optimizing Operation, Maintenance, and Rehabilitation of Sanitary Sewer Collection Systems, Chapter 7, Operation, Maintenance, and Rehabilitation Techniques.

* cited by examiner

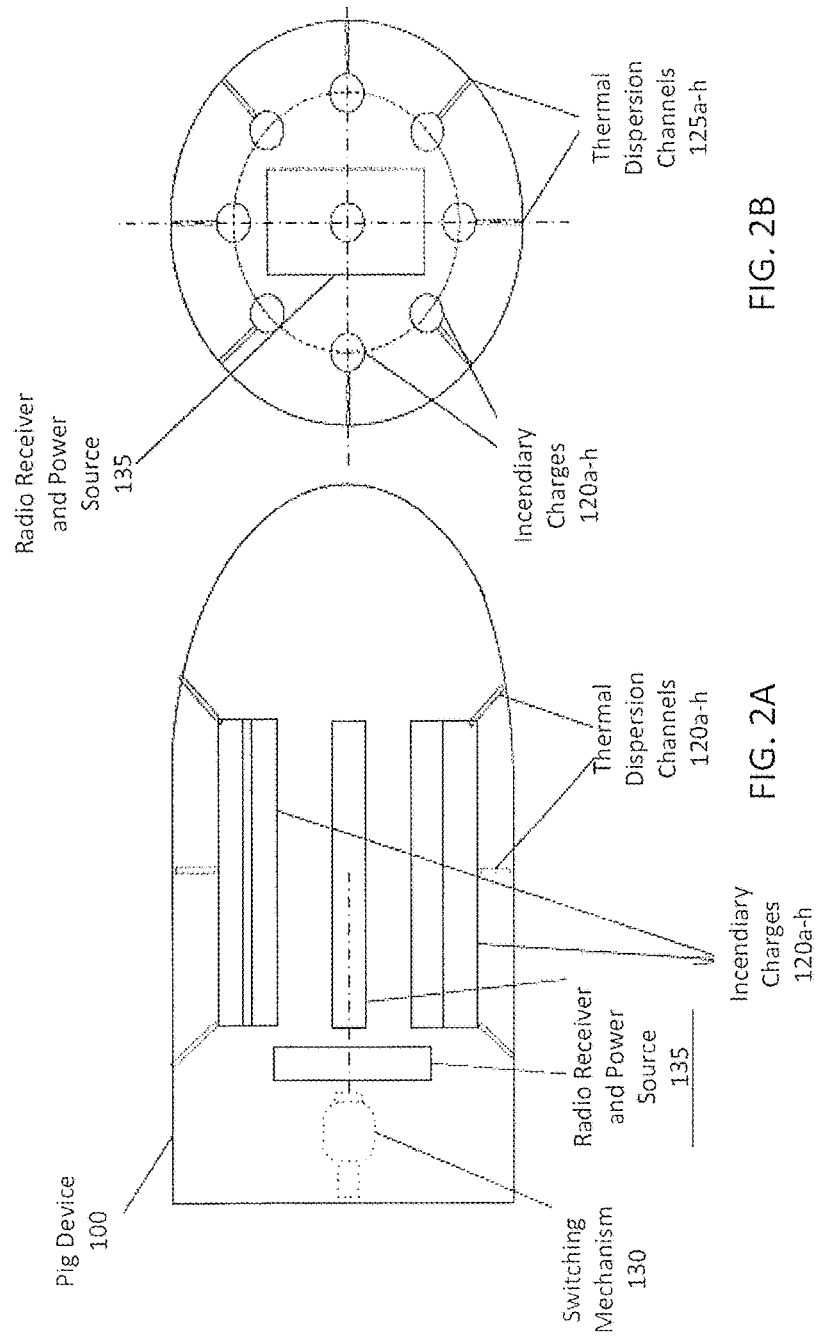

Switching Mechanisms and Charges

Incendiary Charge with Two Igniters

Pig Device with Loaded Charge

Pig Device with Receiver Loaded

Completely Ablated Pig Device

Heat Emitted by Pig Device

Heat Emitted by Pig Device

Heat Emitted by Pig Device

Pig Device in Test Pipe

Rock Dimensions
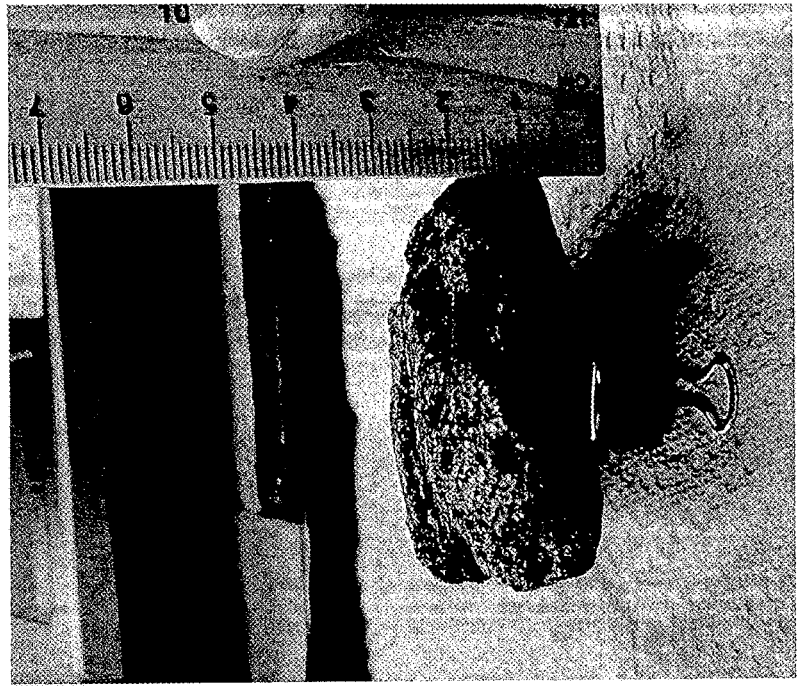
FIG. 16c
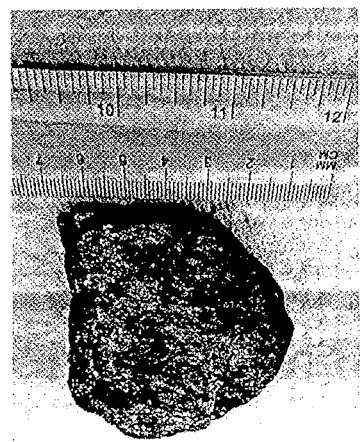
FIG. 16a
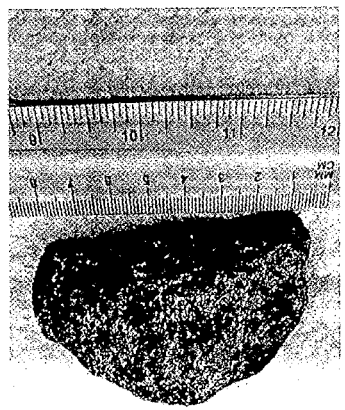
FIG. 16b

Pipe Interior – After Charge

METHOD FOR THERMAL ABLATION OF PIGGING DEVICES

RELATED APPLICATIONS

This Application is a continuation of pending U.S. patent application Ser. No. 15/187,866, filed on Jun. 21, 2016, entitled System and Method for Thermal Ablation of Pigging Devices, which itself claims priority under 35 U.S.C. § 119(e) to U.S. Provisional Patent Application No. 62/184,981, filed on Jun. 26, 2015, entitled "System and Method for Thermal Ablation of Pigging Devices." These applications are hereby incorporated by reference in their entireties.

BACKGROUND

Pigging is used as a mechanism to clean internal surfaces of pipelines including sewer, process, water, wastewater and other types of pipes. Pigging is used to reduce the friction losses of pumping energy, improve flow rates of restricted piping, and as a general maintenance process. Typical materials of construction for water pipe and municipal, commercial, and industrial sewer pipe include ductile iron, polyvinyl chloride ("PVC"), and lined ductile iron or cast iron pipe. As sewer force mains are used over time, the flow of sewage is restricted by a buildup of restricting materials on the inside of the pipe. This material includes solid waste, grease, pipe corrosion and other materials. In addition to these restrictions, force sewer mains, which were installed years and sometimes generations ago, are used to carry flow in excess of their original design capacity. As the pipe is restricted over time, the pumping horsepower requirement increases, flow is reduced, and electrical energy consumption of the pump is increased.

Pigging is the process of inserting a device (known commercially as a pig) into the pipe through an insertion point installed at a particular location in the pipe. The insertion point is generally referred to as a launch station, and includes an array using a tee, valving, and a pressure injection point to allow the pig to be inserted into the pipe and then propelled through the pipe via motive force which may be water, steam or compressed air. Once inserted, the pig is propelled through the length of pipe, which is typically underground, to a designated removal point. While traversing the pipe the pig scours the inner wall of the pipe, without damaging the pipe, to remove any flow restricting material.

Pig construction is generally of polyurethane foam, with or without an abrasion resistant cover. Alternate pig materials of the prior art include Styrofoam, polypropylene, and ice. Various abrasive coatings may also be used and brushes may be adhered or fastened to the bearing surfaces (where the pig is in contact with the pipe wall). These abrasive coatings and brushes aid the pig in clearing debris from the interior of the pipe.

Currently, pigging utilizes a process of progressive pigging, wherein several pigs of varying diameters, all being smaller in overall outside diameter than the nominal inside diameter of the pipe, are used to insure that no obstruction which would cause the pig's progress though the pipe to be impeded to the point of the pig being stalled or stuck in the pipe. Once a smaller diameter pig has successfully traversed the length of pipe being cleaned, a slightly larger pig is inserted, and the process repeated until near nominal internal pipe diameter is reached, or obstruction of the pipe becomes a risk. During the pigging process the pressure of the propulsion medium is monitored continuously. So long as the pig is traveling through the pipe, the pressure remains at a constant level, plus or minus a predetermined tolerance. As fluid or gas is injected into the pipe, the pig travels through the pipe increasing the effective volume filled by the propulsion media, resulting in relatively constant pressure. If the pig movement stops, the volume behind the pig within the pipe no longer increases, and as propulsion material is added the pressure within the pipe will rise rapidly.

A stalled or stuck pig represents a significant technical and logistical problem. The overwhelming majority of wastewater and sewage piping is installed underground. Based on the age and location of the pipe, as well as potential interference with other utility piping, the effect on other electrical and telecommunication utilities by a stuck or stalled pig is largely unknown. Even in a scenario where the exact pipe location is documented, the exact pig location within the pipe may still be unknown.

As a result, the location and retrieval of a stalled pig can be incredibly costly. Often, the retrieval requires a utility shutdown, a diversion of sewage via multiple vacuum trucks at sewage interceptors, and coordination with municipal and utility entities to divert traffic flow and coordinate utility shutdowns while excavation and removal of the stuck pig occurs. In such a case, the only method to remove a stalled pig is to begin excavating the pipe. Due to the fact that the exact location of the stuck pig is unknown, multiple excavations may be required until the exact location of the stalled pig is determined and successful removal of the pig is achieved.

As an alternative to progressive pigging, and in an attempt to mitigate the risk and cost of a stalled or suck pig, a process of pigging has been modified to use pigs made of ice or gelatin. Pigs made of these materials will degrade and break down as the pig travels the length of the pipe. This modification substantially eliminates the risk of a stalled pipe since the pig will melt or erode as it passes through the pipe. Pigs made of ice will continue to melt even after the pig becomes stalled or stuck in the pipe. The erosive nature of pigs made of these materials often eliminates the problem with no need for excavation of the pipe or other remedial action. Unfortunately, the overall dimension of the ice or gelatin pig begins to decrease as soon as the pig is inserted into the pipe. As the pig traverses the length of the pipe, the reduction in overall dimension continues, resulting in a reduction in effectiveness of the ice or gelatin pig as the pig travels the length of the pipe. Ultimately, use of an ice or gelatin pig for long distance pigging is of very little if any benefit.

There exists a need for a novel pig design that substantially reduces the risk of the pig being stuck or stalled in a pipe and which can be retrieved without substantial additional risk or cost. It would also be advantageous if the novel pig design improved and maintained the effectiveness of the pig as it travels the length of the pipe, thereby improving current methods for pigging of long distance pipelines.

SUMMARY OF THE INVENTION

The present disclosure provides for a novel pig design and retrieval method based on thermal ablation. The pig is constructed with a correctly engineered incendiary charge corresponding to the size, density, and the materials of construction of both the pig and the pipe in which the pig will be used. The incendiary charge is correctly sized so that the pig is sufficiently destroyed upon ignition to allow any remaining components or residue in the pipe to be passed through the pipe without the need to excavate the pipe to retrieve the pig. The pig may be designed to be destroyed automatically, manually, or by a combination of automatic control with manual override of the incendiary charge.

In one embodiment, the present disclosure provides for a pig device comprising an external layer and an inner core made of polyurethane foam. The inner core may further comprise at least one incendiary charge wherein each incendiary charge further comprises at least one exothermic material. At least one ignition source may be coupled to each incendiary charge and be configured so as to ignite the associated incendiary charge. A plurality of thermal dispersion channels may be arranged in the inner core to enable the exothermic material to evenly propagate through the pig device and cause its destruction. One or more switching mechanisms may be configured to control the activation of the ignition source thereby controlling the release of the exothermic material through the pig device.

In another embodiment, the present disclosure provides for a method for thermally ablating a pig device. This method may comprise providing a pig device comprising an external layer and an inner core, wherein the inner core comprises one or more incendiary charges and wherein each incendiary charge further comprises one or more exothermic materials. The ignition source, which is operably coupled to an incendiary charge, may be ignited, to thereby release the exothermic material into one or more thermal dispersion channels. The interior of each thermal dispersion channel is melted to thereby disperse the exothermic material through the inner core and thereby destroy the pig device.

In another embodiment, the present disclosure provides for a method for retrieving a pig device which is destroyed using thermal ablation. The method may comprise first locating the pig device within a pipeline by detecting radio signals emitted by a radio receiver located within the pig device. Once the pig device has been located, the method may further comprise igniting at least one ignition source, wherein each ignition source is operably coupled to an incendiary charge, to thereby release at least one exothermic material into one or more thermal dispersion channels. The interior of each thermal dispersion channel is melted to thereby disperse the exothermic material through the inner core of the pig device and thereby destroy the pig device. The destroyed pig may then be easily retrieved at its detected location.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings:

FIG. 2A is representative of a side view of a pig of the present disclosure.

FIG. 2B is representative of a front view of a pig of the present disclosure.

FIGS. 16A-16C illustrates the dimensions of a rock used as an obstruction in experimental designs used to test the effectiveness of a pig device of the present disclosure. FIG. 16A shows the width of the rock obstruction as being approximately four inches. FIG. 16B shows the length of the rock obstruction as being approximately seven inches and FIG. 16C shows the height of the rock obstruction as being approximately 2.5 inches.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
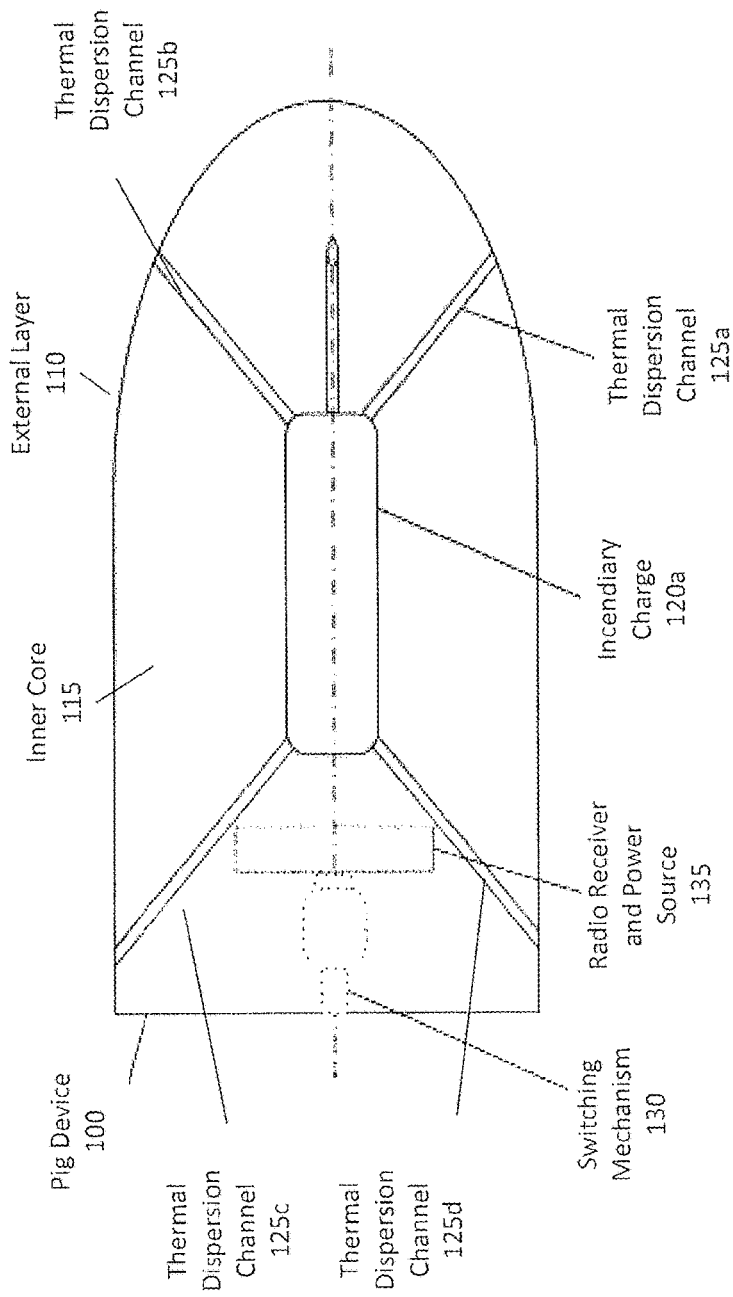
FIG. 1 is representative of a pig of the present disclosure.

The pig device of the present disclosure overcomes the limitations of the prior art by providing a novel design for easy location, destruction, and retrieval of the pig using thermal ablation techniques. Referring to FIG. 1, the pig device 100 may comprise an external layer 110 and an inner core 115. In one embodiment, both the external layer 110 and the internal core 115 may comprise a polyurethane foam material. Constructing the pig device 100 using a polyurethane material is advantageous over the designs of the prior art that use materials such as gelatin or ice. Where pigs constructed using gelatin or ice degrade as the pig travels the length of a pipe, the polyurethane pig of the present disclosure maintains it size, and therefore its efficacy, until it is deflagrated in accordance with the methods disclosed herein. The external layer 110 may further comprise an abrasive-resistant cover configured to protect the pig device from damage as it travels the length of a pipe and one or more abrasive coatings or brushes configured to clear debris from interior of the pipe.

Referring again to FIG. 1, the pig device 100 may comprise at least one incendiary charge 120a where each incendiary charge comprises one or more exothermic materials. When the incendiary charge 120a is ignited by an ignition source, the exothermic materials are released into a plurality of thermal dispersion channels 125a-125d. The thermal dispersion channels are designed so as to prevent water or other materials from entering the inner core of the pig device and disrupting or preventing the ignition process. In one embodiment, the mal dispersion channels 125a-125d may be filled with a material, such as paraffin wax, which melts upon the ignition of the incendiary charge and provides channels for the exothermic material to evenly disperse through the pig device. This dispersion of the exothermic material causes the pig device to deflagrate so that it can be easily retrieved from the pipe. In other embodiments, any hydrophobic material with a low melting point may be used to fill the thermal dispersion channels. One example of a material that may be used as an alternative to paraffin wax is heavy grease. The thermal dispersion channels may also be left unfilled. In such an embodiment, the ends of these thermal dispersion channels may be plugged with a room temperature vulcanizing sealant to prevent water and other materials from entering the inner core.

Figures 3A, 3B:
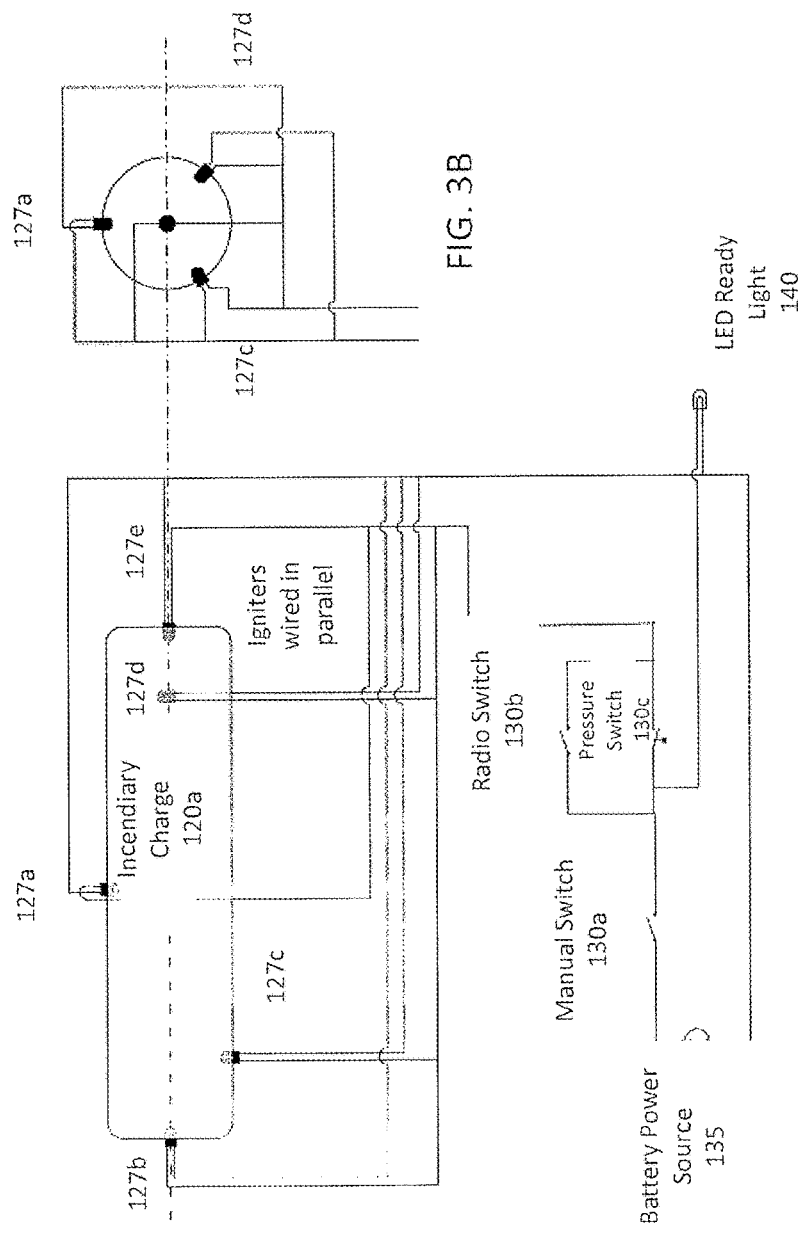
FIG. 3A is representative of a side view of the switching mechanisms and charge configurations of the pig device of the present disclosure.
FIG. 3B is representative of a front view of the switching mechanisms and charge configurations of the pig device of the present disclosure.

Ignition of the incendiary charge 120a may be achieved via one or more switching mechanisms 130. These switching mechanisms are known in the art and may include at least one of: a manual hardwired switching mechanism, a manual radio controlled switching mechanism, and an automatic pressure sensing switching mechanism. An exemplary design of the switching mechanism 130 is illustrated in more detail in FIG. 3A and FIG. 3B. FIG. 3A is representative of a side view of the various charges and switching mechanisms contemplated by the present disclosure while FIG. 3B is representative of a front view of these various mechanisms. While the embodiment of FIG. 3A and FIG. 3B illustrate the pig device 100 as comprising all three switching mechanisms, it is noted that not all three switching mechanisms are required and other embodiments may utilize only one or two of the illustrated switching mechanisms. A manual hardwired switching mechanism 130a may be used to fire the pig device 100 via tether wire connected directly to the pig firing controls and fed into the pipe via a wire reel setup at the launch station. This firing control configuration is best suited as a manual backup to the automatic firing control system which may be onboard the pig. Best applications for this switching mechanism include firing in a deeply buried or extremely long pipe where the approximate location of the pig may be difficult to determine. This manual hardwired switching mechanism 130a is also useful for ablating a pig located within a ductile iron pipe which is impervious to radio frequency signals.

A manual radio controlled switching mechanism 130b may be used to fire the pig device 100 via a remote control with a radio receiver mounted on board the pig. In one embodiment, the radio receiver may comprise an attendant 9 volt battery. Manual radio remote control firing alone is applicable to scenarios where adequate pressure control and regulation is not available or practical, or pipe distance is relatively short, allowing the operator the ability to walk the length of the pipe, generating multiple ignition requests.

A pressure sensing switching mechanism 130c may be used to fire the pig device 100 by sensing when a set pressure has been reached. For example when the pressure on the pressure sensing switching mechanism 130c reaches a specified level due to a propulsion material added to the pipe, the switch will close an electrical contact and cause the incendiary charge 120a to fire. Igniters 127a-127e may be wired in parallel and operably coupled to the incendiary charge 120a and function to ignite the incendiary charge 120a. As can be seen in FIG. 3A and FIG. 3B, these igniters 127a-127e may be placed at various locations around the incendiary charge 120a. A radio receiver, to locate the pig device 100 within a pipe, and radio receiver and power source 135 may also be located with in the inner core 115 of the pig device 100. In one embodiment, the power source 135 may comprise one or more batteries.

FIG. 2A and FIG. 2B are illustrative of another embodiment of the pig device 100 of the present disclosure. As seen in FIGS. 2A and 2B, the pig device 100 comprises a plurality of incendiary charges 120a-120h configured in a circular arrangement (which can be seen from the front view of the pig device 100 in FIG. 2B) in the inner core 115. It is noted that any number and any arrangement of the incendiary charges may be used based on the size of the pig device 110 as necessary to achieve the ablation of the pig device 100. As seen in FIG. 2A each incendiary charge 120a-h is coupled to a thermal dispersion channel 125a-125h to ensure the exothermic material is evenly distributed throughout the pig device 100. This coupling between each incendiary charge 120a-h and the thermal dispersion channels 125a-125h is further illustrated in FIG. 2B.

Figure 4:
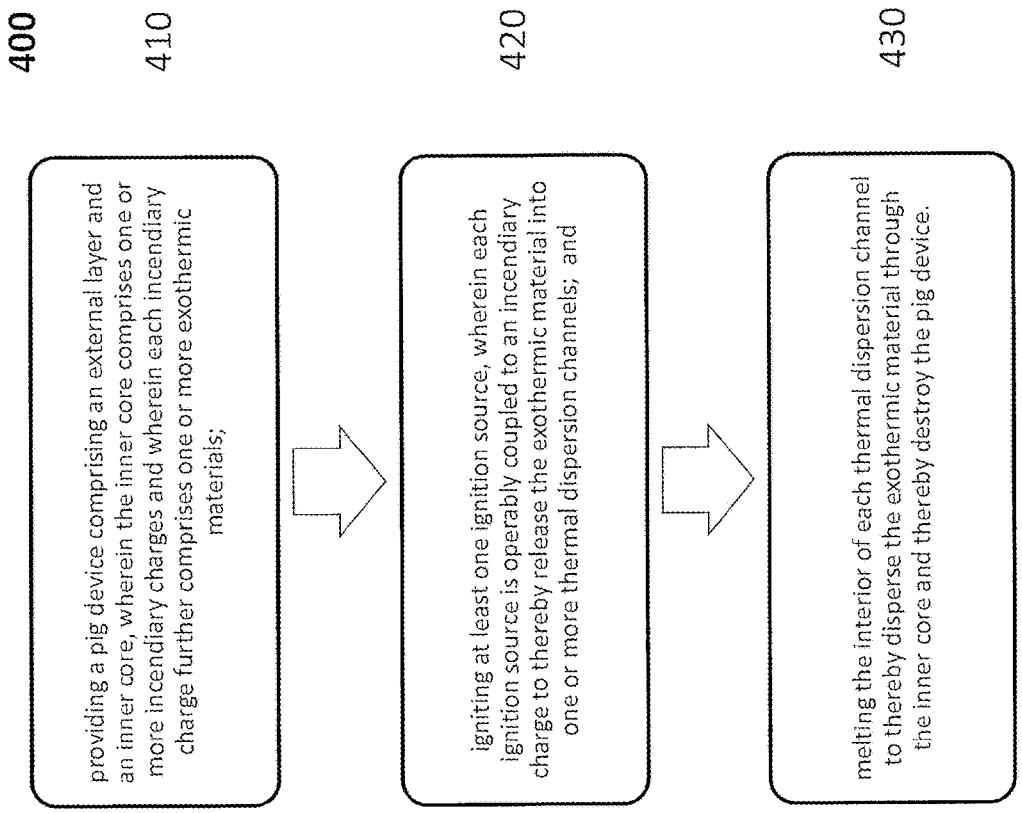
FIG. 4 is representative of a method of the present disclosure.

The present disclosure also provides for a method for thermally ablating a pig device, one embodiment of which is illustrated in FIG. 4. The method 400 may comprise providing a pig device comprising an external layer and an inner core, wherein the inner core comprises one or more incendiary charges and wherein each incendiary charge further comprises one or more exothermic materials in step 410. An ignition source, operably coupled to each incendiary charge, may be ignited in step 420 to thereby release the exothermic material into one or more thermal dispersion channels. The interior of each thermal dispersion channel is melted in step 430 by the exothermic material which enables the exothermic material to propagate through the pig device thereby destroying it by thermal ablation.

Figure 5:
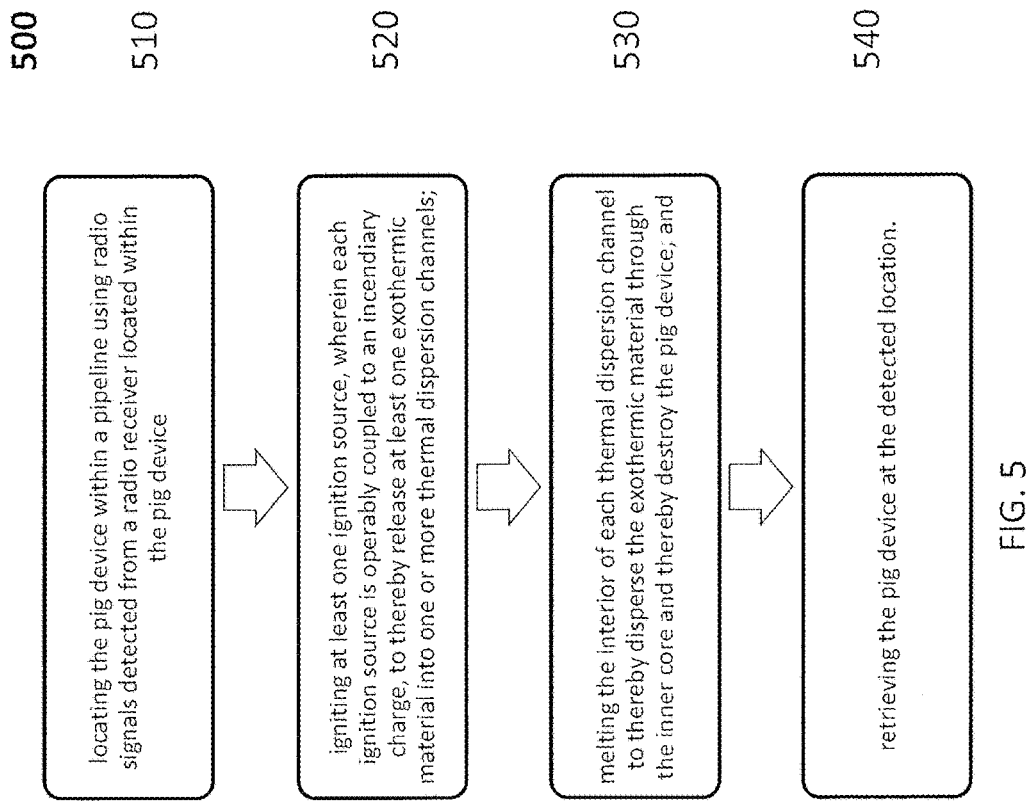
FIG. 5 is representative of a method of the present disclosure.

In another embodiment, the present disclosure provides for a method for retrieving a pig device that has been ablated using the methods disclosed herein. Such a method 500, illustrated by FIG. 5, may comprise locating the pig device within a pipeline using radio signals detected from a radio receiver located within the pig device in step 510. In step 520, at least one ignition source may be ignited, wherein each ignition source is operably coupled to an incendiary charge. Once ignited, the incendiary charge releases at least one exothermic material into one or more thermal dispersion channels. The interior of each thermal dispersion channel may be melted in step 530 to disperse the exothermic material through the inner core and thereby destroy the pig device. The pig may be retrieved in step 540 at the detected location within the pipe.

Examples

Figure 6:
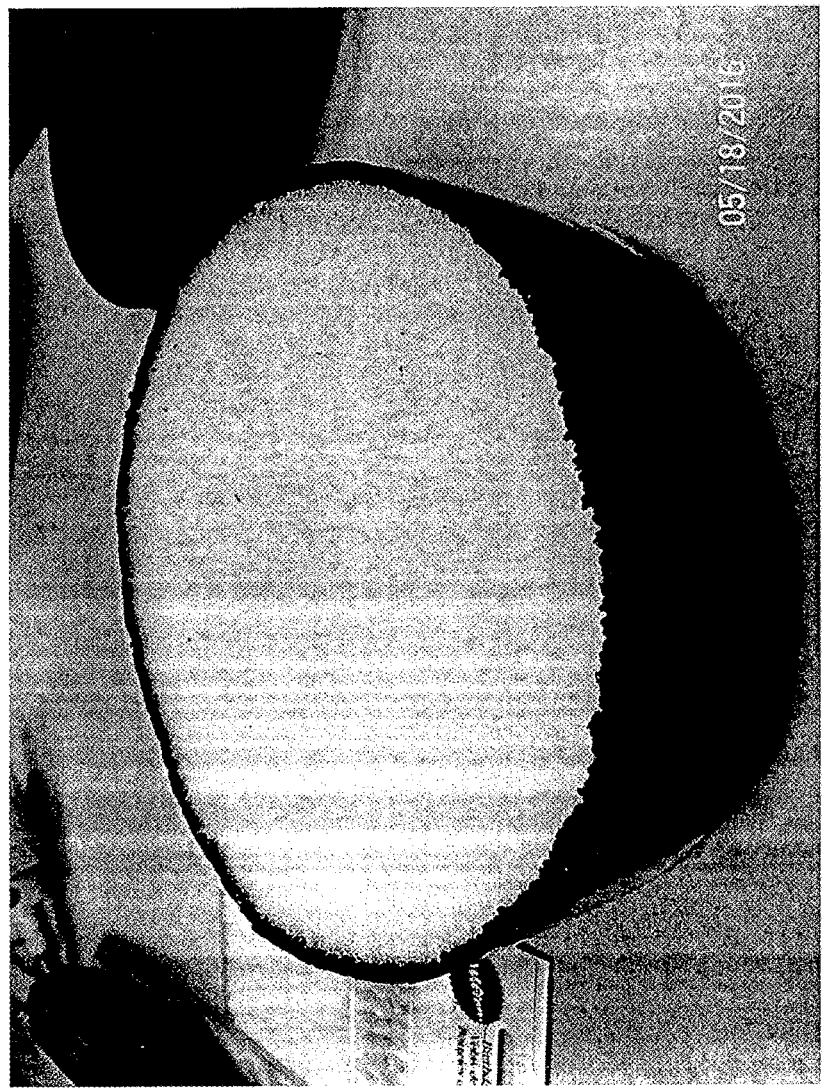
FIG. 6 is representative of a base of a pig device of the present disclosure with an inner core made of polyurethane foam.
Figure 7:
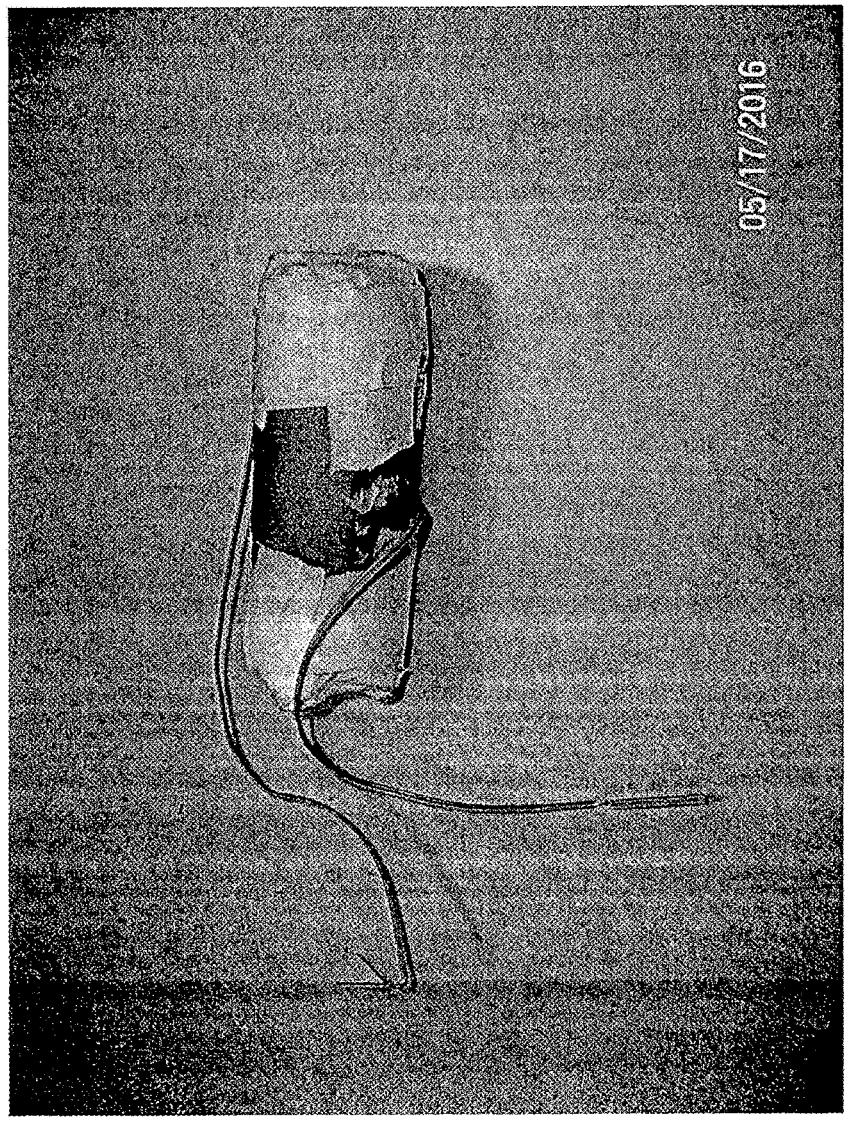
FIG. 7 is representative of an incendiary charge used in a pig of the present disclosure with two igniters.
Figure 8:
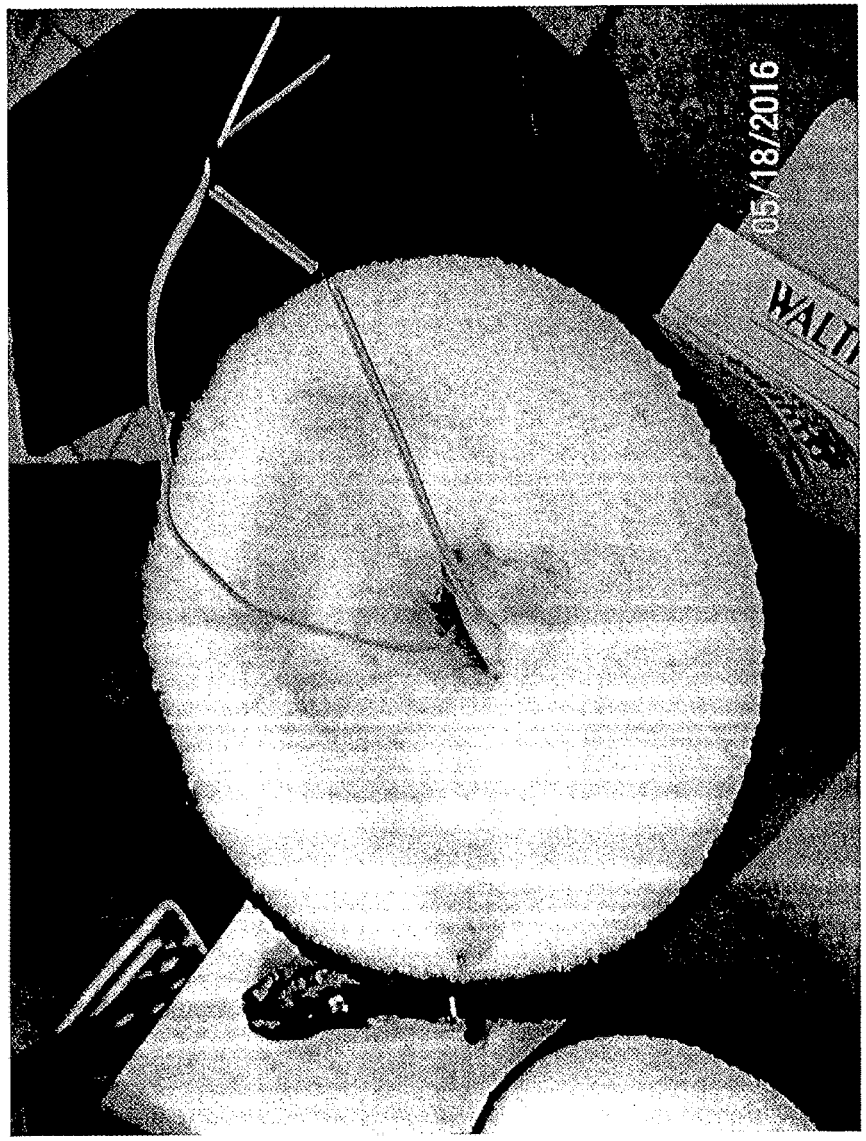
FIG. 8 is representative of a pig device loaded with an incendiary charge.
Figure 9:
FIG. 9 is representative of a pig device loaded with a radio receiver.
Figure 10:
FIG. 10 is representative of a pig device ablated using the methods described herein.
Figure 11:
FIG. 11 is representative of a pig device ablated using the methods described herein.

The following example details experiments designed and implemented using the pig device and ablation methods of the present disclosure. FIGS. 6-20 illustrate an exemplary pig design used in the experimental set up described herein. FIG. 6 illustrates the base of a pig device with a polyurethane foam inner core. An incendiary charge with two igniters is illustrated in FIG. 7 and FIG. 8 illustrates this incendiary charge loaded into the base of the pig device. The radio receiver is shown loaded into the pig device in FIG. 9.

Testing results show that the materials and devices consistent with commercial pipe pigging may be effectively ablated or destroyed in place within the pipe to consistently allow materials to be flushed from the pipe past or through significant obstructions using water as a motive force. Due to the combustion process of the methods of the present disclosure, water as the motive force is the only method which may be used in this method of thermal ablation as the water acts a heat sink for the process and effectively protects the pipe from damage. Testing shows that class 200 PVC pipe exhibited zero thickness loss, zero pipe wall distortion and a maximum external temperature of 8.7° F. over the inside of the pipe when surrounded by air. Testing shows pipe discoloration from products of combustion but no surface erosion due to the combustion process. The interior of a pipe after ablation of a pig device using the methods described herein in FIG. 20.

Figure 15:
FIG. 15 is representative of a pig device of the present disclosure inserted into an exemplary pipe during testing.

FIGS. 15-20 illustrate the experimental design set forth herein. In FIG. 15, the pig device is inserted into a pipe. The dimensions of a rock used as an obstruction in this experimental design are set forth in FIGS. 16A, 16B, and 16C. FIG. 16A shows the width of the rock obstruction as being approximately four inches. FIG. 16B shows the length of the rock obstruction as being approximately seven inches and FIG. 16C shows the height of the rock obstruction as being approximately 2.5 inches.

To deflagrate the pig via chemical means in an environment devoid of oxygen gas, such as a pipe, requires utilizing oxidizing agents to provide the necessary oxygen atoms to the system. In this specific case the exothermal reagents must continue to burn even when submerged in water. To accomplish this, a modified form of Ellern's formulation number 36[1] was used which utilizes magnesium and aluminum for fuels with barium sulfate and barium nitrate serving as the oxidizing agents.

The formulation of Ellern was originally intended to be used in underwater flares and therefore holds potential for the present invention. It is, by mass, 16% magnesium, 12% aluminum, 32% barium nitrate, and 32% barium sulfate with an unspecified amount of manganese oxide mixed in with linseed oil to form a binder. With these mass ratios the barium sulfate and barium nitrate are together limiting reactants. Experiments have shown that use of Ellern's formulation will result in difficulty starting the main reaction. It was assumed that the manganese oxide was part of a thermitic reaction to help achieve the activation energy needed to initiate the main reaction. The manganese oxide was removed from the reaction and replaced with stoichiometric amounts of aluminum and iron (III) oxide added prior to combining with the binder. The Al/Fe$_2$O$_3$ reaction is also known to have a relatively low ignition point and be highly exothermic, thus helping to both start the reaction and sustain the high burn temperature needed underwater. The following amounts of each material were used in the present experimental design:

| Modified Formulation: (% composition by mass) | |
|---|---|
| Magnesium | 12.1% |
| Aluminum | 15.2% |
| Barium Nitrate | 24.2% |
| Barium Sulfate | 30.3% |
| Iron (III) Oxide | 18.2% |

To prepare the exothermal mixture atomized aluminum and 325 mesh granular magnesium were combined with powdered forms of the oxidizers and homogenized. The homogenized granular powder was then compounded with pure, unboiled, linseed oil (ρ=0.93 g/ml) using 6 ml of linseed oil per hundred grams of powder to form the material for the charge. The pig device and methods of the present disclosure are not limited to these concentrations. It is contemplated that the following workable ranges of materials may be used (% composition by mass): barium nitrate from about 22.5% to about 27.5%; barium sulfate from about 25.3% to about 33.5%; iron (III) sulfate from about 14.8% to about 19.4%; aluminum fro about 12.8% to about 15.8%; and magnesium from about 10.4% to about 13.5%.

Approximately 210 grams of the exothermal material was packed into a hollow cardboard tube (1.75" diameter, 4.24" long). It is noted that other materials may be used to house the exothermal material including but not limited to glass and plastic. To help insure that the material ignited, a small disk (approximately ¼" thick and approximately 1" in diameter) of secondary ignition material (described herein) was placed on top of the exothermal material and a commercially available pyrotechnics igniter was then placed on top of the secondary ignition material. Cloth medical tape was used to securely fasten the igniter to the ignition material and to seal the end of the tube. It is contemplated that other types of tape or other mechanisms may be used so long as the mechanism securely fastens the igniter and the ignition material and to seal the end of the tube. The cloth tape was then used to secure the igniter wire to the long axis of the tube for stress relief and to ensure that the igniter was not pulled away from the ignition material. This process was repeated on the other end of the charge; each charge has two ignition points (See FIG. 7).

In early tests the commercially available igniters were not always capable of starting the reaction for the primary charge. A secondary ignition charge made of sucrose and potassium nitrate was added between the commercially available igniter and the main charge. The secondary charge was made by mixing 65% potassium nitrate with 35% sucrose; this is a mixture commonly found in model rocketry. The mixture was thoroughly homogenized and then carefully heated (to approximately 160° C.) until the sugar oxidized, turned light brown, and underwent a phase change to form a paste. The paste was then spread on wax paper at approximate ⅛" thickness for cooling. Once re-crystallized, the material was broken into appropriate sized pieces and shaped for use as the secondary ignition material.

There are five heat producing oxidation-reduction reactions used in this device. Reaction enthalpies at 298K were determined by using standard enthalpies of formation[2] and the state law equation. In addition the heat liberated per gram of reactant was also computed.

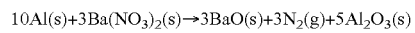
$$10Al(s)+3Ba(NO_3)_2(s) \rightarrow 3BaO(s)+3N_2(g)+5Al_2O_3(s)$$

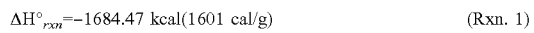
$$\Delta H°_{rxn}=-1684.47 \text{ kcal}(1601 \text{ cal/g}) \quad \text{(Rxn. 1)}$$

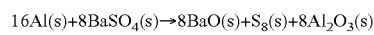
$$16Al(s)+8BaSO_4(s) \rightarrow 8BaO(s)+S_8(s)+8Al_2O_3(s)$$

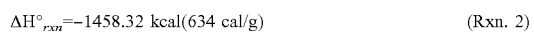
$$\Delta H°_{rxn}=-1458.32 \text{ kcal}(634 \text{ cal/g}) \quad \text{(Rxn. 2)}$$

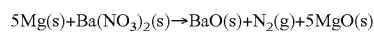
$$5Mg(s)+Ba(NO_3)_2(s) \rightarrow BaO(s)+N_2(g)+5MgO(s)$$

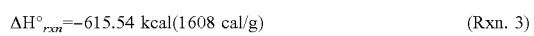
$$\Delta H°_{rxn}=-615.54 \text{ kcal}(1608 \text{ cal/g}) \quad \text{(Rxn. 3)}$$

$$24Mg(s)+8BaSO_4(s) \rightarrow 8BaO(s)+S_8(s)+24MgO(s)$$

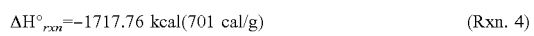
$$\Delta H°_{rxn}=-1717.76 \text{ kcal}(701 \text{ cal/g}) \quad \text{(Rxn. 4)}$$

$2Al(s)+Fe_2O_3(s)\rightarrow Al_2O_3(s)+2Fe(s)$ $\Delta H°_{rxn}=-202.59$ kcal(948 cal/g)  (Rxn. 5)

These values are in rough agreement with values found in the literature which listed 1400 cal/g for reaction 1 and 900 cal/g for reaction 2.[3] Since the entire mixture is homogenized before adding the linseed oil binder it is assumed that the oxidizers are equally available to their pertinent reactions. As such one may further assume that half of each of the $Ba(NO_3)_2$ and $BaSO_4$ oxidizers goes to each of the fuels. In this formulation the oxidizers are the limiting reagents and can therefore be used to stoichiometrically compute the amount of fuel needed and the amount of energy produced by each reaction as seen in Table 1.

TABLE 1

Assuming starting masses of 32 g $Ba(NO_3)_2$, 40 g $BaSO_4$, and 24 g of $Fe_2O_3$.

| Reaction | Oxidizer Mass | Stoichiometric Fuel Mass | Energy from Rxn |
|---|---|---|---|
| 1 | 16 g $Ba(NO_3)_2$ | 5.51 g Al | 34400 cal |
| 2 | 20 g $BaSO_4$ | 4.62 g Al | 15600 cal |
| 3 | 16 g $Ba(NO_3)_2$ | 7.44 g Mg | 37700 cal |
| 4 | 20 g $BaSO_4$ | 6.24 g Mg | 18400 cal |
| 5 | 24 g $Fe_2O_3$ | 8.11 g Al | 30400 cal |
| Total | 127.9 g (132 g if including excess fuel) | | 136500 cal |

Using these totals the energy generated per gram of starting material is 1040 cal/g (or 4.13 btu/g). The PIG is made of a polyurethane core material. Polyurethane foams have approximate heats of combustion of 2400 cal/g (9.52 btu/g)[4]. To completely destroy a pig device would therefore require using approximately 2.3 g of exothermic reactants for each gram of polyurethane to be deflagrated.

Figure 12:
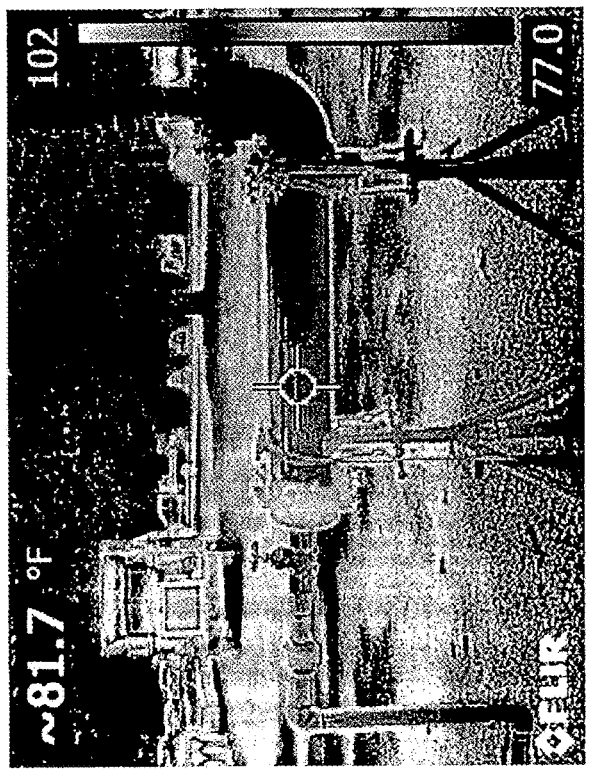
FIG. 12 is a thermal image illustrating heat emitted by a pig device during ablation.
Figure 13:
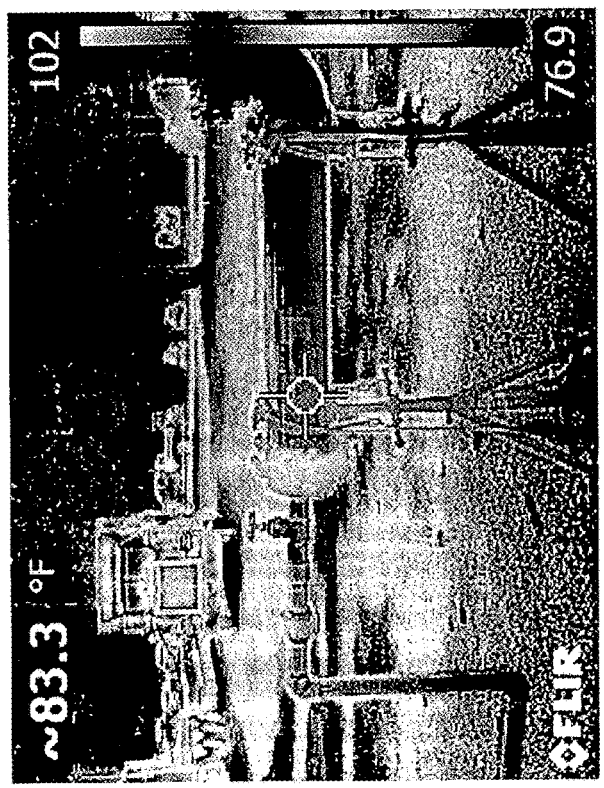
FIG. 13 is a thermal image illustrating heat emitted by a pig device during ablation.
Figure 14:
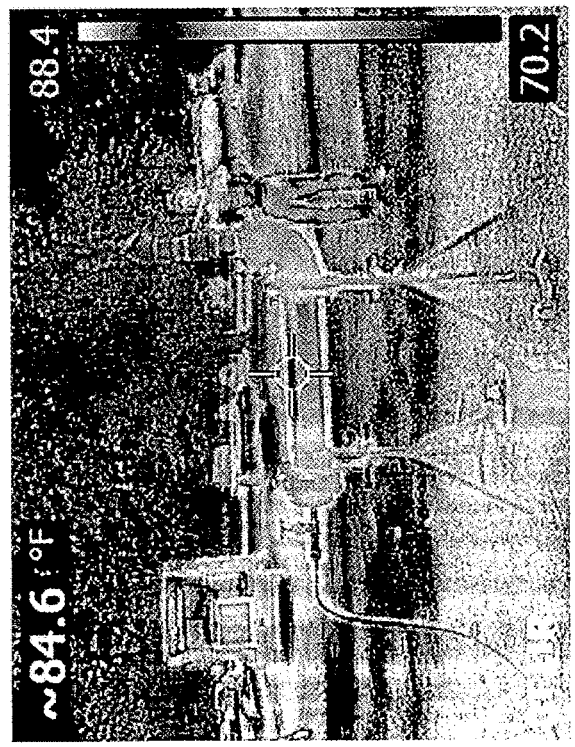
FIG. 14 is a thermal image illustrating heat emitted by a pig device during ablation.
Figure 17:
FIG. 17 is representative of a pig device of the present disclosure inserted into an exemplary pipe during testing showing an obstruction.
Figure 18:
FIG. 18 is representative of a pig device of the present disclosure inserted into an exemplary pipe during testing showing an obstruction.
Figure 19:
FIG. 19 is representative of a pig device of the present disclosure inserted into an exemplary pipe during testing showing an obstruction.
Figure 20:
FIG. 20 is representative of the interior of a pipe after ablation of a pig device using the methods described herein.

A low density polyurethane pig device enclosing 210 grams of exothermal reactants described above was ignited while submerged in 20 gallons of water. FIGS. 17, 18, and 19 illustrate the pig undergoing the reactions described herein. Theoretically, the exothermal reaction should liberate at most 867 btu of energy and increase the temperature of the water by 5.18° F. The temperature of the water was measured via a thermal imager prior to and immediately after the reaction completed as illustrated in FIGS. 12-14. A temperature change of approximately 5° F. was recorded. As such, and within the experimental error of the measuring devices, the thermochemistry described above is consistent with the observed experimental results.

There are numerous exothermal reagents and combinations of exothermal reagents that could be used to accomplish the pig deflagration. This application lays claim to the idea of using an exothermal agent to destroy the pig. In the chemical reactions described above the following oxidations take place: $Mg^0\rightarrow Mg^{II}$ and $Al^0\rightarrow Al^{III}$. The reductions are $N^V\rightarrow N^0$, $S^{VI}\rightarrow S^0$, and $Fe^{III}\rightarrow Fe^0$. Because of their location in the activity series with respect to magnesium and aluminum, several active metals (lithium, potassium, strontium, calcium, sodium) could replace barium as the cation in the oxidizing agents. Similarly, numerous polyatomic ions could potentially be used instead of nitrate and sulfate. The choices of barium nitrate, barium sulfate, and iron (iii) oxide for the prototype device described herein were primarily based on several factors including: (i) the similarity to Ellern's original formulation; (ii) their known characteristics within the pyrotechnics industry; (iii) being readily available from numerous manufacturers; and (iv) the high burning point and insolubility of barium sulfate in water.

The present disclosure may be embodied in other specific fours without departing from the spirit or essential attributes of the disclosure. Accordingly, reference should be made to the appended claims, rather than the foregoing specification, as indicating the scope of the disclosufre. Although the foregoing description is directed to the embodiments of the disclosure, it is noted that other variations and modification will be apparent to those skilled in the art, and may be made without departing from the spirit or scope of the disclosure.

REFERENCES CITED

1. Ellern, Herbert. Military and Civilian Pyrotechnics. (New York: Chemical Publishing Company, 1968).
2. CRC Handbook of Chemistry and Physics, 62nd ed. Robert C. Weast and Melvin J. Astle, eds. (Boca Raton: CRC Press, 1982). pg. D-52.
3. Engineering Design Handbook, Military Pyrotechnics Series. Part 1: Theory and Application. (Washington: U.S. Army Materiel Command, 1967) AMCP 706-185.
4. Krasney, John; Parker, William; Babrauskas, Vytenis. Fire Behavior of Upholstered Furniture and Mattresses. (Norwich: Noyes Publications, 2001); Sundström, B., Grauers, K., and Purser, D. Hazard Analysis in Room, Ch. 3, Fire Safety of Upholstered Furniture—The Full Report of the European Commission Research Program CBUF. B. Sundström, ed. (London: Interscience Communications Ltd., 1995)

The invention claimed is:

1. A method for thermally ablating a pig device located inside of a pipeline comprising: providing a pig device comprising an external layer and an inner core, wherein the inner core comprises one or more incendiary charges and wherein each incendiary charge further comprises one or more exothermic materials; igniting at least one ignition source, wherein each ignition source is operably coupled to at least one of the one or more incendiary charges to thereby release the exothermic material into one or more thermal dispersion channels; melting the interior of each thermal dispersion channel to thereby disperse the exothermic material through the inner core and thereby destroy the pig device, whereby igniting the ignition source is further achieved using at least one of a manual radio controlled switching mechanism and an automatic pressure sensing switching mechanism; and wherein destroying the pig device does not damage the surrounding pipeline.

2. The method of claim 1 further comprising igniting the ignition source via a manual hardwired switching mechanism.

3. The method of claim 1 further comprising utilizing at least one of a secondary ignition material and a pyrotechnic igniter to aid in the ignition of at least one of the one or more incendiary charges.

4. The method of claim 1 wherein the exothermic material further comprises at least one of: barium nitrate, barium sulfate, iron (III) oxide, aluminum, and magnesium.

5. The method of claim 1 wherein the exothermic material further comprises barium nitrate in amounts of about 22.5% to about 27.5% by mass; barium sulfate in amounts of about 25.3% to about 33.5% by mass; iron (III) oxide in amounts of about 14.8% to about 19.4% by mass; aluminum in amounts of about 12.8% to about 15.8% by mass; and magnesium in amounts of about 10.4% to about 13.5%.

6. The method of claim 1 further comprising housing the exothermic material in at least one capsule and wherein the ignition of the incendiary charge causes the capsule to break and release the exothermic material.

7. A method for retrieving a pig device located inside of a pipeline which is destroyed using thermal ablation comprising: locating the pig device within a pipeline using radio signals detected from a radio receiver located within the pig device; igniting at least one ignition source, wherein each ignition source is operably coupled to an incendiary charge, to thereby release at least one exothermic material into one or more thermal dispersion channels, and whereby igniting the ignition source is further achieved using at least one of a manual radio controlled switching mechanism and an automatic pressure sensing switching mechanism; melting the interior of each thermal dispersion channel to thereby disperse the exothermic material through an inner core and thereby destroy the pig device, wherein destroying the pig device does not damage the surrounding pipeline; and retrieving the pig device at the detected location.

8. The method of claim 7 further comprising igniting the ignition source via at least one of: a manual hardwired switching mechanism, a manual radio controlled switching mechanism, and an automatic pressure sensing switching mechanism.

9. The method of claim 7 further comprising utilizing at least one of a secondary ignition material and a pyrotechnic igniter to aid in the ignition of the incendiary charge.

10. The method of claim 7 wherein the exothermic material further comprises at least one of: barium nitrate, barium sulfate, iron (III) oxide, aluminum, and magnesium.

11. The method of claim 7 wherein the exothermic material further comprises barium nitrate in amounts of about 22.5% to about 27.5% by mass; barium sulfate in amounts of about 25.3% to about 33.5% by mass; iron (III) oxide in amounts of about 14.8% to about 19.4% by mass; aluminum in amounts of about 12.8% to about 15.8% by mass; and magnesium in amounts of about 10.4% to about 13.5%.

12. The method of claim 7 further comprising housing the exothermic material in at least one capsule and wherein the ignition of the incendiary charge causes the capsule to break and release the exothermic material.

13. A method for thermally ablating a pig device located inside of a pipeline comprising: providing a pig device comprising an external layer and an inner core, wherein the inner core comprises one or more incendiary charges and wherein each incendiary charge further comprises one or more exothermic materials housed in one or more capsules, wherein the exothermic material is further configured to enable the incendiary charge to burn in water and further comprises at least one of: barium nitrate, barium sulfate, iron (III) oxide, aluminum, and magnesium; igniting at least one ignition source via at least one of: a manual radio controlled switching mechanism and an automatic pressure sensing switching mechanism, wherein each ignition source is operably coupled to an incendiary charge to thereby break the capsule housing the exothermic material and cause the exothermic material to be released into one or more thermal dispersion channels; and melting the interior of each thermal dispersion channel to thereby disperse the exothermic material through the inner core and thereby destroy the pig device wherein destroying the pig device does not damage the surrounding pipeline.

14. The method of claim 13 further comprising utilizing at least one of a secondary ignition material and a pyrotechnic igniter to aid in the ignition of the incendiary charge.

15. The method of claim 13 further comprising locating the pig device within a pipeline using radio signals detected from a radio receiver located within a pig device.

16. The method of claim 15 further comprising retrieving the pig device at the detected location.

\* \* \* \* \*

UNITED STATES PATENT AND TRADEMARK OFFICE
CERTIFICATE OF CORRECTION

PATENT NO. : 10,201,815 B2  Page 1 of 1
APPLICATION NO. : 15/788673
DATED : February 12, 2019
INVENTOR(S) : Sankey et al.

It is certified that error appears in the above-identified patent and that said Letters Patent is hereby corrected as shown below:

On the Title Page

Item (72) In the listing of inventors, the city and state of residence of James R. Collins should be corrected from "Jackson's Gap, PA (US)" to "Jackson's Gap, AL (US)"

Signed and Sealed this
Twenty-ninth Day of October, 2019

Andrei Iancu
*Director of the United States Patent and Trademark Office*